US006352767B1

(12) United States Patent
Kurokawa

(10) Patent No.: US 6,352,767 B1
(45) Date of Patent: Mar. 5, 2002

(54) HEAT TRANSFER SHEET AND PRINTED MATTER

(75) Inventor: Shinichi Kurokawa, Tokyo-To (JP)

(73) Assignee: Dai Nippon Printing Co., Ltd. (JP)

( * ) Notice: Subject to any disclaimer, the term of this patent is extended or adjusted under 35 U.S.C. 154(b) by 0 days.

(21) Appl. No.: 09/319,431

(22) Filed: Jun. 7, 1999

(30) Foreign Application Priority Data

Oct. 7, 1997 (JP) ........................................ 9-290380

(51) Int. Cl.[7] ........................................ B32B 15/04

(52) U.S. Cl. ...................... 428/346; 428/195; 428/206; 428/354; 428/913; 428/914; 503/227

(58) Field of Search ................................ 428/195, 207, 428/346, 347, 354, 913, 914; 8/471; 503/227

(56) References Cited

U.S. PATENT DOCUMENTS 5,387,573 A 2/1995 Oldfield et al. ............. 503/227

FOREIGN PATENT DOCUMENTS

| | | |
|---|---|---|
| EP | 0305922 | 3/1989 |
| EP | 0487727 | 6/1992 |
| EP | 0677397 | 10/1995 |
| GB | 2309538 | 7/1997 |
| JP | 7-276831 | 10/1995 |
| JP | 7-290848 | 11/1995 |
| JP | 7-314932 | 12/1995 |
| JP | 8-230338 | 9/1996 |
| JP | 8-282141 | 10/1996 |

*Primary Examiner*—Bruce H. Hess
(74) *Attorney, Agent, or Firm*—Parkhurst & Wendel, L.L.P.

(57) ABSTRACT

There is provided a thermal transfer sheet which can impart excellent durability to images formed on bases, and printed objects bearing images with excellent durability. The thermal transfer sheet has a releasable protective laminate prepared by laminating a protective layer composed mainly of solvent-insoluble organic fine particles and a binder resin, and an adhesive layer in that order on at least a portion of one side of a base sheet, and the printed objects are formed by transferring the protective laminate by the thermal transfer sheet so as to cover at least a portion of an image formed on a base by a heat-sensitive sublimation transfer system.

5 Claims, 1 Drawing Sheet

HEAT TRANSFER SHEET AND PRINTED MATTER

TECHNICAL FIELD

The present invention relates to a thermal transfer sheet and printed object, and particularly it relates to a thermal transfer sheet which is able to impart excellent durability to the image of a printed object wherein an image is carried on a base, and to a printed object having an image with excellent durability.

BACKGROUND ART

Thermal transfer systems have conventionally been used to form tonal images or monotone images of characters or symbols on bases. The commonly used thermal transfer systems are heat-sensitive sublimation transfer systems and heat-sensitive melt transfer systems.

Of these, heat-sensitive sublimation transfer systems are based on a process which employs a thermal transfer sheet wherein a base sheet carries a dye layer prepared by dissolving or dispersing a sublimation dye used as the coloring material in a binder resin, and after attaching the thermal transfer sheet to a base, energy corresponding to the image data is applied to a heating device such as a thermal head to cause migration of the sublimation dye in the dye layer on the thermal transfer sheet into the base to form an image. Heat-sensitive sublimation transfer systems are excellently suited for formation of tonal images with gradation because they allow control of the amount of migrating dye in dot units based on the amount of energy applied to the thermal transfer sheet.

Many different types of cards, such as identification cards, drivers licenses, membership cards and the like have been used according to the prior art, and such cards contain various information providing clear identification of the owners. In particular, for ID cards it is most important to have facial images together with printed information regarding addresses, names, etc. The data for such cards are recorded with heat-sensitive sublimation transfer systems as described above, since they simplify formation of images, characters and symbols.

However, tonal images and monotone images formed by these heat-sensitive sublimation transfer systems have inferior resistance, including solvent resistance and plasticizer resistance, because of the transferred dye present on the surface, and hence they cannot be used for cards that require degrees of durability, such as ID cards, for example.

A means of solving this problem has been to laminate a polyester film or the like on the formed image. This improves the solvent resistance and plasticizer resistance but can introduce other problems such as impairment of the properties of the printed object bearing the image, for example the folding properties if the printed object is paper, and the magnetic tape or bar code readability if the printed object is a card.

Protective layers have been transferred onto formed images, but conventional protective layers are polymers such as acrylates and polyesters, and their solvent resistance and plasticizer resistance have been inadequate. Also, when resins crosslinked by ultraviolet rays, electron beams or heat are used as protective layers, increasing the crosslinked density can improve the solvent resistance and plasticizer resistance of the protective layer, but there have been problems of poor film cutting properties and occurrence of transfer defects such as tailing during transfer of the protective layer to the image.

DISCLOSURE OF THE INVENTION

In light of the circumstances described above, it is an object of the present invention to provide a transfer sheet which is able to impart excellent durability to images formed on bases, and to a printed object having an image with excellent durability.

In order to achieve this object, the thermal transfer sheet of the invention is characterized by having a protective laminate provided in a releasable manner on at least a portion of one side of a base sheet, the protective laminate comprising a protective layer and an adhesive layer formed in that order from the side of the base sheet, wherein the protective layer contains solvent-insoluble organic fine particles and a binder resin as the main components.

The organic fine particles of the thermal transfer sheet of the invention have a mean particle size in the range of 0.05–1.0 $\mu$m.

The thermal transfer sheet of the invention also preferably has a series of dye layers of one or more colors formed in order on the protective laminate side by side on the base sheet. The printed object of the invention is characterized by being provided with a base, an image formed by a heat-sensitive sublimation transfer method on at least one side of the base, and a protective laminate formed so as to cover at least a portion of the image, wherein the protective laminate is formed by transfer using the above mentioned thermal transfer sheet.

According to an embodiment of the printed product of the invention, the base consists of a card base.

According to the invention as described above, a protective layer composed mainly of solvent-insoluble organic fine particles and a resin binder is formed in a releasable manner together with an adhesive layer on a base sheet to construct a protective laminate, the protective laminate having satisfactory film releasing properties, so that upon transfer onto the image the protective layer becomes situated on the uppermost surface, and therefore the image covered by the protective layer has satisfactory resistance to solvents and plasticizers; furthermore, for printed objects wherein an image is formed on a base by a heat-sensitive sublimation transfer system, the protective layer which covers at least a portion of the image imparts excellent durability to the images of the printed objects.

BEST MODE FOR CARRYING OUT THE INVENTION

Embodiments of the present invention will now be explained with reference to the attached drawings.

Thermal transfer sheet

Figure 1:
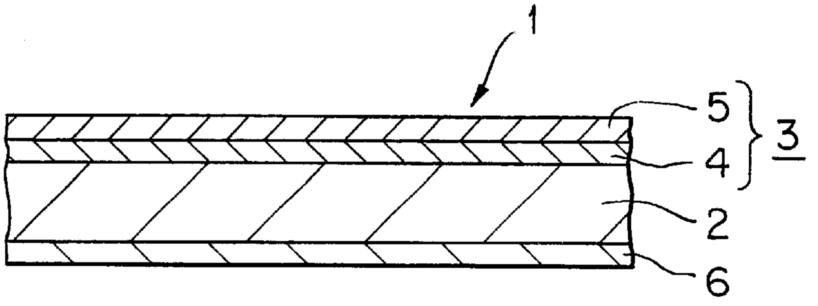
FIG. 1 is a schematic cross-sectional view of an embodiment of a thermal transfer sheet according to the invention.

FIG. 1 is a schematic cross-sectional view of an example of a thermal transfer sheet according to the invention. In FIG. 1, a thermal transfer sheet 1 according to the invention is provided with a protective laminate 3 formed in a releasable manner on one side of a base sheet 2, with a back layer 6 provided on the other side of the base sheet 2. The protective laminate 3 is a laminate prepared by laminating a protective layer 4 and an adhesive layer 5 in that order from the side of the base sheet 2. The term "laminate", according to the present invention includes cases where the layers forming the laminate are formed by coating.

The base sheet 2 used to construct the thermal transfer sheet 1 of the invention may be a base sheet used for conventional thermal transfer sheets. As specific preferred base sheets there may be mentioned thin paper such as glassine paper, condenser paper and paraffin paper, stretched and unstretched films of plastics, including highly heat-resistant polyesters such as polyethylene terephthalate, polyethylene naphthalate, polybutylene terephthalate, polyphenylene sulfide, polyether ketone and polyether sulfone, as well as polypropylene, polycarbonate, cellulose acetate, polyethylene derivatives, polyvinyl chloride, polyvinylidene chloride, polystyrene, polyamide, polyimide, polymethylpentene, ionomers, etc., and laminates of these materials. The thickness of the base sheet 2 can be appropriately selected depending on the material for suitable strength and heat resistance, but it is usually preferred to be about 1–100 μm.

The protective layer 4 constituting the protective laminate 3 of the thermal transfer sheet 1 is one composed mainly of solvent-insoluble organic fine particles and a binder resin.

Solvent-insoluble organic fine particles include substantially transparent fine particles such as crosslinked acryl fine particles, crosslinked polystyrene fine particles, crosslinked polystyrene acryl fine particles and these fine particles with functional derivatives on the surface. Here, "solvent-insoluble" according to the invention will refer to organic fine particles which, after immersion in a solvent (xylene, toluene, tetrahydrofuran, methyl ethyl ketone, butyl acetate, n-butanol, ethyl cellosolve) at 20° C. for 12 hours, exhibit no apparent change in the fine particles with observation under a light microscope. Such organic fine particles improve the film cutting property during transfer of the protective laminate 3 to the transfer target, produce no light-diffused clouding due to refractive index differences, such as occurs with inorganic fine particles of silica or the like, and do not impair the quality of protected images.

The mean particle size of these organic fine particles may be designed to be in the range of 0.05–1.0 μm, and preferably 0.1–0.8 μm, and the peak of the particle distribution may be 2 or more within these ranges. The mean particle size of the organic fine particles is preferably not less than 0.05 μm because the film cutting property of the protective layer 4 will be reduced during transfer, and the mean particle size is preferably not greater than 1.0 μm because the transparency of the protective layer 4 will be insufficient. The shape of the organic fine particles used is not particularly restricted, and it may be globular, spherical, flat donut-shaped, fine particle aggregated, etc.

The content of the organic fine particles in the protective layer 4 may be designed to be in the range of 150–2000 parts by weight, and preferably 500–1700 parts by weight, to 100 parts by weight of the binder resin. The content of the organic fine particles is preferably not less than 150 parts by weight because the solvent resistance and plasticizer resistance of the protective layer 4 will be insufficient, and it is preferably not greater than 2000 parts by weight because the transparency of the protective layer 4 will be lower, resulting in a poorer coating condition.

The binder resin used in the protective layer 4 may be a cellulose-based resin such as ethyl cellulose, hydroxyethyl cellulose, hydroxypropyl cellulose, methyl cellulose, cellulose acetate or cellulose acetate butyrate, or a vinyl-based resin such as polyvinyl alcohol, polyvinyl acetate, polyvinyl butyral, polyvinyl acetal, polyvinyl pyrrolidone or polyacrylamide, and from the standpoint of solvent resistance and plasticizer resistance, emulsions of the water-soluble resins polyvinyl alcohol, polyvinyl pyrrolidone, acryl emulsions and urethane emulsions are preferred.

In cases where relatively low solvent resistance is required, for example in cases of protection of images of color prints wherein the images have been formed by a heat-sensitive sublimation transfer system, a solvent-soluble binder resin such as polymethyl methacrylate, polyethylene terephthalate, polyurethane or polycarbonate may be used.

By adding an additive such as an ultraviolet absorber, antioxidant, fluorescent brightening agent or the like to the protective layer 4 it is possible to improve the gloss, light resistance, weather resistance, whiteness, etc. of the image covered with the protective layer 4 after transfer.

The method for forming the protective layer 4 on the base sheet 2 may be a method whereby the solvent-insoluble organic fine particles are mixed with the binder resin and additives are added if necessary to prepare a composition, and the composition is then coated and dried onto the base sheet using publicly known means such as gravure coating, gravure reverse coating or roll coating. The thickness of the formed protective layer 4 is about 0.5–5 μm, and preferably about 1–2 μm.

In order to adjust the releasability between the base sheet 2 and the protective layer 4, a release agent may be included in the protective layer 4 to form a release layer between the base sheet 2 and the protective layer 4.

The release agent included in the protective layer 4 may be a silicone oil, a phosphate ester-based surfactant, a fluorine-based surfactant or the like, with silicone oils being particularly preferred. Modified silicone oils are preferred, such as epoxy-modified, alkyl-modified, amino-modified, carboxyl-modified, alcohol-modified, fluorine-modified, alkyl aralkyl polyether-modified, epoxy/polyether-modified and polyether-modified silicone oils. Such release agents may be used alone or in combinations of two or more, and they are preferably added in the range of 0.5–30 parts by weight to 100 parts by weight of the binder resin used to form the protective layer 4.

The release layer formed between the base sheet 2 and the protective layer 4 can be formed using a release agent such as a wax, silicone wax, silicone resin, fluorine resin, acryl resin or the like. The release layer may be formed by using publicly known means to coat and dry the base sheet 2 with an ink prepared by dissolving or dispersing a mixture of the above-mentioned release agent with necessary additives in an appropriate solvent, and its thickness is preferably about 0.5–5/μm.

The adhesive layer 5 in the protective laminate 3 of the thermal transfer sheet 1 provides an effect of facilitating transfer of the protective laminate 3 onto the transfer target. The adhesive used to form the adhesive layer 5 may be a hot-melt adhesive, such as an acryl, styrene-acryl, vinyl chloride, styrene-vinyl chloride-vinyl acetate copolymer or vinyl chloride-vinyl acetate copolymer. The adhesive layer 5 may be formed by publicly known means such as gravure coating, gravure reverse coating or roll coating, and the thickness of the adhesive layer is preferably about 0.1–5 μm.

The adhesive layer 5 may also contain additives such as antioxidants and fluorescent brightening agents.

The back layer 6 of the thermal transfer sheet 1 is provided for the purpose of preventing thermal fusion between the heating device, such as a thermal head, and the base sheet 2, for smoother running. The resin used in the back layer 6 maybe a single natural or synthetic resin, or mixture thereof, for example, a cellulose-based resin such as ethyl cellulose, hydroxy cellulose, hydroxypropyl cellulose, methyl cellulose, cellulose acetate, cellulose acetate butyrate or nitrocellulose; a vinyl-based resin such as polyvinyl alcohol, polyvinyl acetate, polyvinyl butyral, polyvinyl acetal or polyvinylpyrrolidone; an acrylic resin such as polymethyl methacrylate, polyethyl acrylate, polyacrylamide or acrylonitrile-styrene copolymer; or a polyamide resin, polyvinyl toluene resin, coumarone-indene resin, polyester-based resin, polyurethane resin, silicone-modified or fluorine-modified urethane, etc. For increased heat resistance of the back layer 6, it is preferred to use the resins mentioned above that have hydroxy-based reactive groups, in combination with polyisocyanate or the like as a crosslinking agent, to form a crosslinked resin layer.

In order to provide a sliding property against the thermal head, a solid or liquid release agent or lubricating agent may be added to the back layer 6 for heat resistant lubrication. The release agent or lubricating agent used may be, for example, a wax such as polyethylene wax or paraffin wax, a higher aliphatic alcohol, organopolysiloxane, anionic surfactant, cationic surfactant, amphoteric surfactant, nonionic surfactant, fluorine-based surfactant, organic carboxylic acid or a derivative thereof, a fluorine-based resin, silicone-based resin, or fine particles of an inorganic compound such as talc, silica, etc. The amount of the release agent or lubricating agent in the back layer 6 is 5–50 wt %, and preferably about 10–30 wt %.

The thickness of the back layer 6 may be about 0.1–10 μm, and preferably about 0.5–5 μm.

Figure 2:
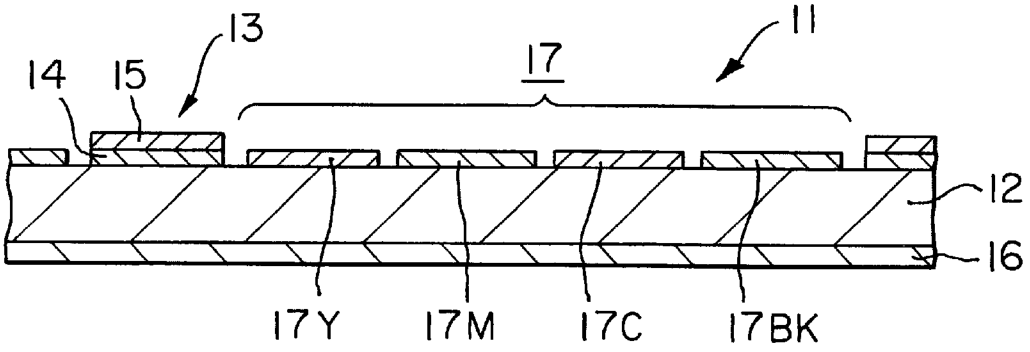
FIG. 2 is a schematic cross-sectional view of another embodiment of a thermal transfer sheet according to the invention.

FIG. 2 is a schematic cross-sectional view of another embodiment of a thermal transfer sheet according to the invention. In FIG. 2, the thermal transfer sheet 11 is a composite-type thermal transfer sheet provided with a protective laminate 13 and a dye layer 17 in that order on one side of a base sheet 12, and provided with a back layer 16 on the other side of the base sheet 12.

The protective laminate 13 is a laminate provided with a protective layer 14 and an adhesive layer 15 in the same manner as the protective laminate 3 described above, and its explanation will be omitted here. The base sheet 12 and back layer 16 are also identical to those of the thermal transfer sheet 1 described above.

The dye layer 17 comprises dye layers 17Y, 17M, 17C and 17BK of the different hue, yellow, magenta, cyan and black. The dye layer 17 (17Y, 17M, 17C, 17BK) contains at least a sublimation dye and a binder resin.

The sublimation dye used is not particularly restricted, and it may be any sublimation dye used for thermal transfer sheets in conventional publicly known heat-sensitive sublimation transfer systems. Specifically, as yellow dyes there may be mentioned Phorone Brilliant Yellow 6GL, PTY-52, Macrolex Yellow 6C, etc., as red dyes there may be mentioned MS Red G, Macrolex Red-Violet R, Ceres Red 7B, Samaron Red HBSL, SK Rubin SEGL, etc., and as blue dyes there may be mentioned Kayacet Blue 714, Waxolin AP-FW, Phorone Brilliant Blue S-R, MS Blue 100, Daito Blue No.1, etc. Sublimation dyes having respective hue may also be combined to form dye phases of desired hue, such as black.

The binder resin used to carry the dye in the dye layer 17 can be any conventional publicly known one, and for example there may be mentioned cellulose-based resins such as ethyl cellulose, hydroxyethyl cellulose, hydroxypropyl cellulose, methyl cellulose, cellulose acetate and cellulose acetate butyrate, vinyl-based resins such as polyvinyl alcohol, polyvinyl acetate, polyvinyl butyral, polyvinyl acetal, polyvinyl pyrrolidone and polyacrylamide, polyesters, etc., among which cellulose-based, acetal-based, butyral-based and polyester-based resins are preferred from the standpoint of heat resistance and dye migration properties.

The dye layer 17 is formed by using publicly known means to coat and dry a base sheet with a composition prepared by dissolving or dispersing the sublimation dye and binder resin, together with the necessary additives, in an appropriate solvent. The thickness of the dye layer 17 may be set within a range of 0.2–5 μm, and preferably 0.4–2 μm, and the proportions of the sublimation dye in the dye layer 17 is in the range of 5–90 wt %, and preferably 10–70 wt %.

In the thermal transfer sheet 11 described above the order was protective laminate 13→17Y→17M→17C→17BK, but there is no restriction to this order. The black dye layer 17BK may also be absent. Some or all of the dye layers 17 (17Y, 17M, 17C, 17BK) may also have a double layer structure.

The thermal transfer sheet of the invention is not restricted to the mode described above, and it may have any desired design based on the purpose of use, etc. In particular, preparation of a composite-type thermal transfer sheet makes it possible to simultaneously accomplish image formation and transfer of the protective laminate onto the transfer target with a thermal transfer system.

Printed object

A printed object according to the invention will now be explained.

Figure 3:
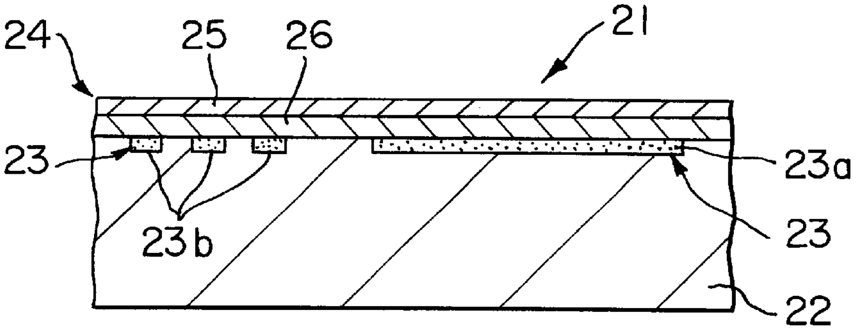
FIG. 3 is a schematic cross-sectional view of an embodiment of a card as an example of a printed object according to the invention.

FIG. 3 is a schematic cross-sectional view of an embodiment of a card as an example of a printed product according to the invention. In FIG. 3, the card 21 has a card base 22 and an image 23 recorded by a heat-sensitive sublimation transfer system on one side of the card base 22, and is provided with a protective laminate 24 formed so as to cover the image 23. The image 23 comprises a full-color image 23*a* composed of the three colors yellow, magenta and cyan, or if necessary 4 colors including black, and a monotone image 23*b* of characters, symbols or the like.

In the card 21 shown in FIG. 3, the entire image 23 is covered by the protective laminate 24, and the protective laminate 24 has a double-layer structure with an adhesive layer 26 and a protective layer 25 laminated from the side of the card base 22. The protective laminate 24 with a double-layer structure can be formed by using the thermal transfer sheet 1 of the invention to transfer the protective laminate 3 so as to cover the image 23. Consequently, the protective layer 25 composed mainly of solvent-insoluble organic fine particles and a binder resin is situated on the uppermost surface of the protective laminate 24, and thus the image 23 of the card 21 which is the printed object of the invention is provided with satisfactory resistance, including solvent resistance and plasticizer resistance, due to the protective laminate 24.

The protective layer 25 and adhesive layer 26 of which the protective laminate 24 is composed correspond respectively to the protective layer and adhesive layer composing the protective laminate of the thermal transfer sheet of the invention, and their explanation will therefore be omitted.

The image 23 may be formed on the card base 22 using a thermal transfer sheet of a conventionally publicly known heat-sensitive sublimation transfer system or a composite-type thermal transfer sheet according to the invention as described above which is provided with a protective laminate and a dye layer.

The card as the printed object of the invention is not limited to the mode described above, and for example when an image is present on the other side of the card base 22 that image may also be covered with a protective laminate 24.

The card base 22 of the card described above as an example of a printed object according to the invention is not particularly restricted so long as the side having an image recorded with a heat-sensitive sublimation transfer system, such as a full-color image, has dye tingibility, and a resin sheet of polyvinyl chloride, polyester, etc. or a metal sheet may be used. The thickness of the card base 22 may be appropriately set depending on the purpose for use of the card.

Figure 4:
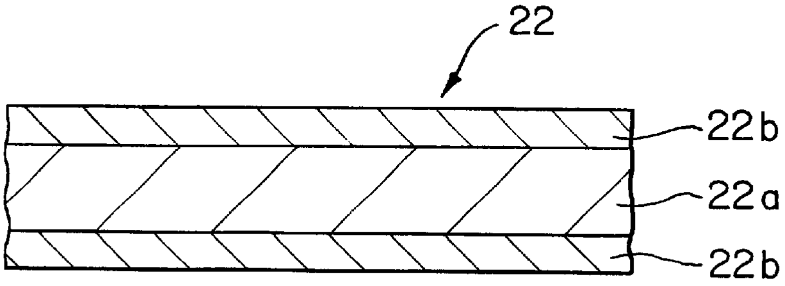
FIG. 4 is a schematic cross-sectional view of an example of a card base used to construct a card as an example of a printed object according to the invention.

FIG. 4 is a schematic cross-sectional view of an example of a card base that can be used in a card as an example of a printed object according to the invention. In FIG. 4, the card base 22 has a triple-layer structure wherein polyvinyl chloride layers 22*b* are laminated on both sides of a center core 22*a*. The center core 22*a* used may be, for example, a hard white polyvinyl chloride resin sheet with a thickness of about 0.1–0.8 mm. This triple-layer structure of the card base can effectively prevent curling during recording of the image with a thermal transfer system.

In order to impart dye tingibility to the polyvinyl chloride layer 22*b* at least on the side having an image recorded with a heat-sensitive sublimation transfer system, such as a full-color image, of the polyvinyl chloride layers 22*b* laminated on both sides of the center core 22*a*, a plasticizer may be added at 0.1–10 parts by weight and preferably 3–5 parts by weight to 100 parts by weight of the polyvinyl chloride. If the plasticizer content is less than 0.1 part by weight, the dye tingibility of the polyvinyl chloride layer 22*b* will be insufficient, resulting in abnormal transfer whereby the dye layer of the thermal transfer sheet is completely transferred during the thermal transfer, and if the plasticizer content exceeds 10 parts by weight the rigidity of the polyvinyl chloride layer 22*b* will be inadequate resulting in softness, while undesirable blotting may occur in the dye image during storage.

The plasticizer used may be a conventional publicly known plasticizer such as dibutyl phthalate, di-n-octyl phthalate, di(2-ethylhexyl) phthalate, dinonyl phthalate, dilauryl phthalate, butyl lauryl phthalate, butyl benzyl phthalate, di(2-ethylhexyl) adipate, di(2-ethylhexyl) sebacate, tricresyl phosphate, tri(2-ethylhexyl) phosphate, a polyethylene glycol ester, epoxy fatty acid ester or the like.

Addition of a lubricating agent to the plasticizer at 0.1–5 parts by weight to 100 parts by weight of the polyvinyl chloride prevents blocking between the card base and the thermal transfer sheet during recording of an image with a heat-sensitive sublimation transfer system and further improves the dye tingibility of the polyvinyl chloride layer 22*b*, even if the plasticizer is added to the polyvinyl chloride layer 22*b* in a relatively large amount, for example at a proportion of 5–10 parts by weight. The lubricating agent used may be any conventional publicly known lubricating agent such as a fatty acid, fatty acid amide, wax, paraffin or the like. The polyvinyl chloride layer 22*b* may also contain other desired additives such as coloring pigments, whitening pigments, extender pigments, fillers, ultraviolet absorbers, anti-static agents, heat stabilizers, antioxidants, fluorescent brighteners, etc.

The polyvinyl chloride layer 22*b* may be transparent at least on the side having an image recorded with a heat-sensitive sublimation transfer system, such as a full-color image, of the polyvinyl chloride layers 22*b* laminated on both sides of the center core 22*a*, in order to improve the depth of the image and its three-dimensional appearance.

The card base 22 as described above may have a magnetic recording layer, optical memory, IC memory, bar code or the like formed on its surface either beforehand or after recording of the image.

The card base 22 in the example described above has a triple-layer structure, but it is also possible to use a base sheet with a multilayer structure of more than three layers, or a base sheet with a monolayer structure of polyvinyl chloride, acrylonitrile-butadiene-styrene copolymer, polycarbonate, polyethylene terephthalate, paper or the like.

The recording of the image 23 onto the card base 22 described above with a heat-sensitive sublimation transfer system may be accomplished using a thermal transfer sheet of a conventional publicly known heat-sensitive sublimation transfer system such as described above.

The printed product of the invention is not restricted to a card such as mentioned above, and it has an image formed on any desired base with a heat-sensitive sublimation transfer system, with a protective laminate formed so as to cover at least a portion of the image.

EXAMPLES

The present invention will now be explained in further detail by way of concrete examples.

Preparation of Thermal Transfer Sheet (Sample 1)

A gravure coating method was used to coat one side of a 12-μm thick polyethylene terephthalate film (Lumira, manufactured by Toray, KK.) with a back layer ink, which was then dried to form a back layer.

The side opposite the side on which the back layer had been formed was then coated with a release layer mixture having the composition listed below (coverage: 1.5 g/m$^2$ (when dried)) by a gravure coating method and dried to form a release layer, after which the release layer was coated with protective ink A having the composition listed below (coverage: 2.5 g/m$^2$ (when dried)) by a gravure coating method and dried to form a protective layer.

| | |
|---|---|
| (Composition of release layer mixture) | |
| Polymethyl methacrylate (LP-45M, product of Soken Kagaku, KK.) | 100 pts. by wt. |
| Toluene | 50 pts. by wt. |
| Methyl ethyl ketone | 50 pts. by wt. |
| Polyester (Byron 200, product of Toyobo, KK.) | 1 pt. by wt. |
| (Composition of protective layer mixture A) | |
| Solvent-insoluble organic fine particle aqueous dispersion (Muticle, product of Mitsui Toatsu Kaguku, KK., mean particle size: 0.5 μm) | 135 pts. by wt. (solid portion) |
| Polyvinyl alcohol (C-318, product of The Inktech, KK.) | 27 pts. by wt. |
| Ethanol | 27 pts. by wt. |
| Water | 6 pts. by wt. |

The protective layer was further coated with an adhesive layer mixture having the composition listed below (coverage: 1.0 g/m$^2$ (when dried)) by a gravure coating method and dried to form an adhesive layer, thereby obtaining a thermal transfer sheet (Sample 1) provided with a releasable protective laminate which was a laminate of a release layer, a protective layer and an adhesive layer.

| (Composition of adhesive layer mixture) | |
|---|---|
| Polyvinyl chloride-vinyl acetate copolymer (HND#7, product of The Inktech, KK.) | 100 pts. by wt. |
| Toluene | 50 pts. by wt. |
| Methyl ethyl ketone | 50 pts. by wt. |

(Sample 2)

A thermal transfer sheet (Sample 2) was obtained in the same manner as Sample 1 above, except that the protective layer mixture used was protective layer mixture B having the composition listed below including a different binder resin.

| (Composition of protective layer mixture B) | |
|---|---|
| Solvent-insoluble organic fine particle aqueous dispersion (Muticle, product of Mitsui Toatsu Kaguku, KK., mean particle size: 0.5 μm) | 80 pts. by wt. (solid portion) |
| Water-soluble acryl emulsion (Bariaster B-1000, product of Mitsui Toatsu Kagaku, KK.) | 20 pts. by wt. |
| Ethanol | 30 pts. by wt. |
| Water | 10 pts. by wt. |

(Sample 3)

A thermal transfer sheet (Sample 3) was obtained in the same manner as Sample 1 above, except that the protective layer mixture used was protective layer mixture C including organic fine particles with a smaller mean particle size.

| (Composition of protective layer mixture C) | |
|---|---|
| Solvent-insoluble organic fine particle aqueous dispersion (Muticle, product of Mitsui Toatsu Kagaku, mean particle size: 0.1 μm) | 135 pts. by wt. (solid portion) |
| Polyvinyl alcohol (C-318, product of The Inktech, KK.) | 27 pts. by wt. |
| Ethanol | 27 pts. by wt. |
| Water | 6 pts. by wt. |

(Sample 4)

A thermal transfer sheet (Sample 4) was obtained in the same manner as Sample 1 above, except that the protective layer mixture used was protective layer mixture D including organic fine particles with a larger mean particle size.

| (Composition of protective layer mixture D) | |
|---|---|
| Solvent-insoluble organic fine particle aqueous dispersion (Muticle, product of Mitsui Toatsu Kagaku, KK., mean particle size: 1.0 μm) | 135 pts. by wt. (solid portion) |
| Polyvinyl alcohol (C-318, product of The Inktech, KK.) | 27 pts. by wt. |
| Ethanol | 27 pts. by wt. |
| Water | 6 pts. by wt. |

(Sample 5)

A thermal transfer sheet (Sample 5) was obtained in the same manner as Sample 1 above, except that the protective layer mixture used was protective layer mixture E having a lower content of organic fine particles.

| (Composition of protective layer mixture E) | |
|---|---|
| Solvent-insoluble organic fine particle aqueous dispersion (Muticle, product of Mitsui Toatsu Kagaku, KK., mean particle size: 0.5 μm) | 71 pts. by wt. (solid portion) |
| Polyvinyl alcohol (C-318, product of The Inktech, KK.) | 42 pts. by wt. |
| Ethanol | 31 pts. by wt. |
| Water | 6 pts. by wt. |

(Sample 6)

A thermal transfer sheet (Sample 6) was obtained in the same manner as Sample 1 above, except that the protective layer mixture used was protective layer mixture F having a higher content of organic fine particles.

| (Composition of protective layer mixture F) | |
|---|---|
| Solvent-insoluble organic fine particle aqueous dispersion (Muticle, product of Mitsui Toatsu Kagaku, KK., mean particle size: 0.5 μm) | 255 pts. by wt. (solid portion) |
| Polyvinyl alcohol (C-318, product of The Inktech, KK.) | 15 pts. by wt. |
| Ethanol | 19 pts. by wt. |
| Water | 6 pts. by wt. |

(Sample 7)

A thermal transfer sheet (Sample 7) was obtained in the same manner as Sample 1 above, except that the protective layer mixture used was protective layer mixture G including organic fine particles with a very small mean particle size.

| (Composition of protective layer mixture G) | |
|---|---|
| Solvent-insoluble organic fine particle aqueous dispersion (Muticle, product of Mitsui Toatsu Kagaku, KK., mean particle size: 0.01 μm) | 135 pts. by wt. (solid portion) |
| Polyvinyl alcohol (C-318, product of The Inktech, KK.) | 27 pts. by wt. |
| Ethanol | 27 pts. by wt. |
| Water | 6 pts. by wt. |

(Sample 8)

A thermal transfer sheet (Sample 8) was obtained in the same manner as Sample 1 above, except that the protective layer mixture used was protective layer mixture H including organic fine particles with a very large mean particle size.

| (Composition of protective layer mixture H) | |
|---|---|
| Solvent-insoluble organic fine particle aqueous dispersion (Muticle, product of Mitsui Toatsu Kagaku, KK., mean particle size: 1.5 μm) | 135 pts. by wt. (solid portion) |
| Polyvinyl alcohol (C-318, product of The Inktech, KK.) | 27 pts. by wt. |
| Ethanol | 27 pts. by wt. |
| Water | 6 pts. by wt. |

(Sample 9)

A thermal transfer sheet (Sample 9) was obtained in the same manner as Sample 1 above, except that the protective layer mixture used was protective layer mixture I having a very low content of organic fine particles.

| (Composition of protective layer mixture I) | |
|---|---|
| Solvent-insoluble organic fine particle aqueous dispersion (Muticle, product of Mitsui Toatsu Kagaku, KK., mean particle size: 0.5 μm) | 50 pts. by wt. (solid portion) |
| Polyvinyl alcohol (C-318, product of The Inktech, KK.) | 50 pts. by wt. |
| Ethanol | 29 pts. by wt. |
| Water | 6 pts. by wt. |

(Sample 10)

A thermal transfer sheet (Sample 10) was obtained in the same manner as Sample 1 above, except that the protective layer mixture used was protective layer mixture J having a very high content of organic fine particles.

| (Composition of protective layer mixture J) | |
|---|---|
| Solvent-insoluble organic fine particle aqueous dispersion (Muticle, product of Mitsui Toatsu Kagaku, mean particle size: 0.5 μm) | 216 pts. by wt. (solid portion) |
| Polyvinyl alcohol (C-318, product of The Inktech, KK.) | 9 pts. by wt. |
| Ethanol | 22 pts. by wt. |
| Water | 6 pts. by wt. |

(Sample 11)

A thermal transfer sheet (Sample 11) was obtained in the same manner as Sample 1 above, except that the protective layer mixture used was protective layer mixture K having the composition listed below using a solvent-soluble binder resin.

| (Composition of protective layer mixture K) | |
|---|---|
| Solvent-insoluble organic fine particle aqueous dispersion (Muticle, product of Mitsui Toatsu Kagaku, KK., mean particle size: 0.5 μm) | 135 pts. by wt. (solid portion) |
| Water-soluble polyester (solvent-soluble binder resin) (Polyester WR-961, product of Nihon Gosei Kagaku, KK.) | 27 pts. by wt. |
| Ethanol | 30 pts. by wt. |
| Water | 10 pts. by wt. |

(Comparative Sample 1)

A thermal transfer sheet (Comparative Sample 1) was obtained in the same manner as Sample 1 above, except that the protective layer mixture used was protective layer mixture L having the composition listed below containing no solvent-insoluble organic fine particles.

| (Composition of protective layer mixture L) | |
|---|---|
| Polymethyl methacrylate (LP45M B-4, product of Soken Kagaku, KK.) | 50 pts. by wt. |
| Methyl ethyl ketone | 25 pts. by wt. |
| Toluene | 25 pts. by wt. |

(Comparative Sample 2)

A thermal transfer sheet (Comparative Sample 2) was obtained in the same manner as Sample 1 above, except that the protective layer mixture used was protective layer mixture M having the composition listed below containing no solvent-insoluble organic fine particles, and the coating of the protective layer mixture M was followed by crosslinking by irradiation with a 5 MRAD electron beam.

| (Composition of protective layer mixture M) | |
|---|---|
| Ultraviolet curing resin (ST-HC SD-21, product of The Inktech, KK.) | 50 pts. by wt. |
| Methyl ethyl ketone | 12.5 pts. by wt. |
| Toluene | 12.5 pts. by wt. |

Image Formation

First, a gravure coating method was used to coat a polyethylene terephthalate film having a back layer formed in the same manner described above with different dye layer mixtures having the compositions listed below, on the side opposite the side on which the back layer had been formed, in the order of yellow, magenta, cyan to a width of 15 cm (length in the direction of flow of the base sheet) (coverage: 1.0 g/m$^2$ (when dried)), and this was dried to fabricate a heat-sensitive sublimation transfer system thermal transfer sheet with 3 colors in one set.

| (Yellow coating solution) | |
|---|---|
| Yellow disperse dye (Macrolex Yellow 6G, Bayer, KK.) | 4 pts. by wt. |
| Ethylhydroxy cellulose (product of Hercules, KK.) | 5 pts. by wt. |
| Methyl ethyl ketone/toluene (wt. ratio 1/1) | 80 pts. by wt. |

(Magenta coating solution)

Same as the aforementioned yellow coating solution, except that a magenta disperse dye (C.I. Disperse Red 60, product of Bayer, KK.) was used as the disperse dye.

(Cyan coating solution)

Same as the aforementioned yellow coating solution, except that a cyan disperse dye (Kayacet Blue 714, product of Nihon Kayaku, KK.) was used as the disperse dye.

A card base center core (thickness: 0.2 mm) with the following composition was fabricated next.

(Center core composition)

Polyvinyl chloride (polymerization degree: 800)100 pts. by wt.

White pigment (titanium oxide) 10 pts. by wt.

A transparent sheet (thickness: 0.15 mm) made of the following composition was then fabricated, and was thermocompression bonded to both sides of the aforementioned center core to fabricate a card base (86×54 mm) with a triple-layer structure.

| (Composition of transparent sheet) | |
|---|---|
| Polyvinyl chloride (polymerization degree: 800) | 100 pts. by wt. |
| Plasticizer (DOP) | 3 pts. by wt. |
| Lubricating agent (stearic acid amide) | 1 pt. by wt. |

The above-mentioned heat-sensitive sublimation transfer system heat transfer sheet was placed on the card base, and a thermal head connected to an electrical signal obtained by color separation of a facial image was used to apply heat energy from the back layer side of the thermal transfer sheet, to form a full-color image by sublimation transfer in the order of cyan, magenta, yellow.

Formation of Protective Layer

Next, each of the aforementioned thermal transfer sheets (Samples 1–11, Comparative Samples 1–2) was used to transfer a protective laminate so as to cover the full-color image formed in the manner described above, to fabricate cards as printed objects, in the manner shown in FIG. 3.

The solvent resistance, plasticizer resistance, transparency and film cutting property of each card was evaluated by the methods described below, and the results are listed in Table 1.

(Evaluation of solvent resistance)

Two different solvents (toluene, xylene) were used, dropping the solvents down on the card surface with a dropper, © Satisfactory image was visible ○ Some feeling of cloudiness, but no problem with image visibility Δ Cloudiness, also affecting image visibility X Considerable cloudiness, no visibility of image (Evaluation of film cutting property)

The edge sections after transfer of the protective laminate were observed under a microscope, and a visual examination was made of the degree of tailing.

Evaluation scale:

© No problem (no tailing)

○ Tailing of <0.5 mm

Δ Tailing of 0.5 mm to <1.0 mm

X Tailing of 1.0 mm or greater

TABLE 1

| Thermal transfer sheet | Organic file particles of protective layer: Mean particle size ($\mu$m) | Organic file particles of protective layer: Content*[1] (pts. by wt.) | Solvent resistance*[2] A | Solvent resistance*[2] B | Plasticizer resistance | Transparency | Film cutting property |
|---|---|---|---|---|---|---|---|
| Sample 1 | 0.5 | 500 | ◎ | ◎ | ◎ | ◎ | ◎ |
| Sample 2 | 0.5 | 400 | ○ | ○ | ○ | ◎ | ◎ |
| Sample 3 | 0.1 | 500 | ◎ | ◎ | ◎ | ◎ | ○ |
| Sample 4 | 1.0 | 500 | ◎ | ◎ | ◎ | ○ | ◎ |
| Sample 5 | 0.5 | 170 | ○ | ◎ | ○ | ○ | ○ |
| Sample 6 | 0.5 | 1700 | ◎ | ◎ | ◎ | ○ | ◎ |
| Sample 7 | 0.01 | 500 | ◎ | ◎ | ◎ | ◎ | Δ |
| Sample 8 | 1.5 | 500 | ◎ | ◎ | ◎ | Δ | ○ |
| Sample 9 | 0.05 | 100 | Δ | ○ | Δ | ◎ | ○ |
| Sample 10 | 0.5 | 2400 | ◎ | ◎ | ◎ | Δ | ◎ |
| Sample 11 | 0.5 | 500 | x | ○ | ○ | ◎ | ◎ |
| Comparative Sample 1 | — | — | x | ○ | Δ | ◎ | Δ |
| Comparative Sample 2 | — | — | ◎ | ◎ | ◎ | ○ | x |

*[1]Content with respect to 100 parts by weight of binder resin
*[2]A: Solvent = toluene B: Solvent = xylene and a visual examination was made of any deterioration of the image upon wiping off after 10 seconds.

Evaluation scale:

◎ Virtually no change

○ Somewhat blotchy

Δ Very blotchy

X Image completely disappeared (Evaluation of plasticizer resistance)

An eraser was placed on the surface of the card, a load of 60 g/cm$^2$ was applied thereto, and the condition was observed after standing at 60° C. for 10 hours.

Evaluation scale:

© No change

○ Slight transfer of image to eraser

Δ Transfer of image to eraser, and image of card slightly blotchy

X Considerable transfer of image to eraser, and image of card very blotchy (Evaluation of transparency)

The cloudiness of the card image was visually evaluated.

Evaluation scale:

As shown in Table 1, the solvent resistance, plasticizer resistance, transparency and film cutting (releasing) property were all satisfactory for the printed objects (cards) that employed thermal transfer sheets (Samples 1–6) wherein the protective layer was composed mainly of solvent-insoluble organic fine particles and a binder resin, the mean particle size of the organic fine particles was in the range of 0.05–1.0 $\mu$m and the organic fine particle content was in the range of 150–2000 parts by weight to 100 parts by weight of the binder resin.

Also, the solvent resistance, plasticizer resistance, transparency and film cutting property were all inferior for the printed objects (cards) that employed thermal transfer sheets (Samples 7–10) wherein the mean particle size of the organic fine particles or the organic fine particle content with respect to 100 parts by weight of the binder resin was outside of these ranges.

The printed object (card) that employed a thermal transfer sheet (Sample 11) using a solvent-soluble resin (polyester) as the binder resin exhibited no resistance to the strong solvent, toluene, but had resistance to the weak solvent (xylene), while the plasticizer resistance, transparency and film cutting property were all satisfactory, thus confirming its usability for purposes that have a low requirement for solvent resistance.

On the other hand, the printed object (card) that employed a thermal transfer sheet (Comparative Sample 1) containing no organic fine particles had inferior solvent resistance, plasticizer resistance and film cutting property, and although the other printed object (card) that employed a thermal transfer sheet (Comparative Sample 2) containing no organic fine particles had excellent solvent resistance and plasticizer resistance, it exhibited an inferior film cutting property due to the high crosslinked density of the protective layer.

As explained above, the present invention provides a thermal transfer sheet wherein at least a portion of one side of a base sheet is provided with a releasable protective laminate prepared by laminating a protective layer composed mainly of solvent-insoluble organic fine particles and a binder resin with an adhesive layer in that order for a satisfactory film cutting property of the protective laminate, and since the protective laminate is transferred onto the image with the protective layer situated on the uppermost surface, the image covered by the protective laminate is imparted with satisfactory resistance to solvents, plasticizers and the like. Furthermore, a printed object having such an image formed on a base by a heat-sensitive sublimation transfer system thus bears an image with excellent durability, since at least a portion of the image is covered by the aforementioned protective laminate.

What is claimed is:

1. A thermal transfer sheet comprising a protective laminate provided in a releasable manner on at least a portion of one side of a base sheet, said protective laminate comprising a protective layer and an adhesive layer formed in that order from the side of said base sheet, wherein said protective layer contains solvent-insoluble organic fine particles and a binder resin and the solvent-insoluble organic fine particles are present in the protective layer in an amount of 150 to 2,000 parts by weight per 100 parts by weight of the resin binder.

2. A thermal transfer sheet according to claim 1, wherein said organic fine particles have a mean particle size in the range of 0.05–1.0 μm.

3. A thermal transfer sheet according to claim 1, wherein a series of dye layers of one or more colors are formed side by side on said protective laminate on said base sheet.

4. A printed object provided with a base, an image formed by a heat-sensitive sublimation transfer on at least one side of said base, and a protective laminate formed so as to cover at least a portion of said image, wherein said protective laminate is formed using a thermal transfer sheet according to claim 1.

5. A printed object according to claim 4, wherein said base is a card base.

* * * * *